United States Patent [19]

Pless

[11] 3,960,959

[45] June 1, 1976

[54] N,N'-BIS{6-[(3,4-DIHYDROXYPHENYL)ALKYLAMINO]-HEXYL}HEXAMETHYLENEDIAMINES AND THE SALTS THEREOF

[75] Inventor: Janos Pless, Basel, Switzerland

[73] Assignee: Sandoz Ltd., Basel, Switzerland

[22] Filed: Dec. 13, 1974

[21] Appl. No.: 532,465

[30] Foreign Application Priority Data

Dec. 19, 1973 Switzerland.................. 17769/73
Oct. 23, 1974 Switzerland.................. 14174/74
Oct. 23, 1974 Sweden....................... 7414173

[52] U.S. Cl..................... 260/570.5 P; 260/482 B; 260/501.18; 260/501.19; 260/534 E; 260/559 A; 260/559 D; 260/561 A; 260/561 HL; 260/570.5 C; 260/570.8 R; 260/521 R; 424/316; 424/330

[51] Int. Cl.².......................... C07C 91/32

[58] Field of Search.............. 260/570.5 P, 570.8 R, 260/501.18, 501.19

[56] References Cited

UNITED STATES PATENTS 2,653,977  9/1953  Craig et al................. 260/570.5

Primary Examiner—Robert V. Hines
Attorney, Agent, or Firm—Gerald D. Sharkin; Robert S. Honor; Thomas O. McGovern

[57] ABSTRACT

This invention provides new compounds of formula I,

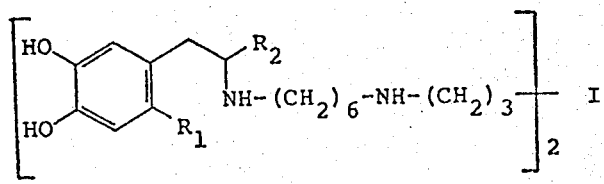

wherein $R_1$ and $R_2$ are hydrogen or lower alkyl, useful as anti-hypertensive agents.

5 Claims, No Drawings

N,N'-BIS 6-[(3,4-DIHYDROXYPHENYL)ALKYLAMINO]-HEXYL HEXAMETHYLENEDIAMINES AND THE SALTS THEREOF

The present invention relates to new phenylethylamine derivatives.

In accordance with the invention there are provided new compounds of formula I,

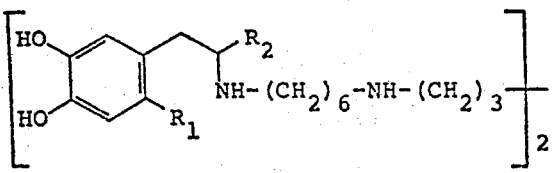

I wherein $R_1$ and $R_2$ are hydrogen or lower alkyl.

When $R_1$ or $R_2$ is lower alkyl, this contains 1 to 5, preferably 1 to 3 carbon atoms, and especially signifies methyl.

Further, in accordance with the invention the compounds of formula I may be obtained by a process comprising a. converting the ether groups into hydroxy groups in a compound of formula II,

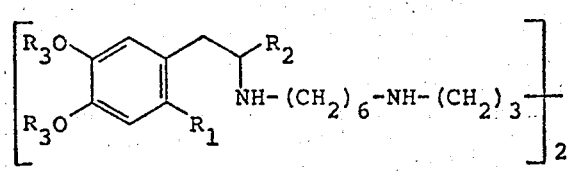

II wherein
$R_1$ and $R_2$ are hydrogen or lower alkyl, and $R_3$ is a radical capable of being removed acidolytically or hydrogenolytically,
or
b. reducing a compound of formula III,

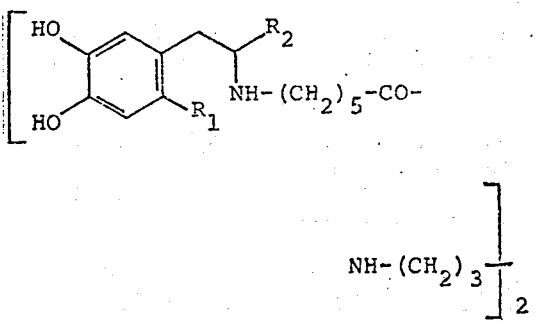

III wherein $R_1$ and $R_2$ are hydrogen or lower alkyl.

Process a) may be effected in accordance with the usual methods for the conversion of ether groups into hydroxy groups.

When $R_3$ in the compounds of formula II is a radical capable of being removed acidolytically, e.g. methyl, ethyl or benzyl, the ether splitting may be effected in accordance with known methods. Thus, for example, a compound of formula II, wherein $R_3$ is a radical capable of being removed acidolytically, may be allowed to react with a Lewis acid, e.g. boron tribromide. The reaction may be effected in an inert organic solvent, e.g. a halogenated hydrocarbon such as methylene chloride or carbon tetrachloride, or an aromatic hydrocarbon such as toluene or benzene. The reaction temperature may be from $-80°$ to $+70°$ C.

Alternatively, the compound of formula II may be treated with a strong mineral acid, e.g. hydrobromic or hydriodic acid. A temperature of from $20°$ to $100°$ C is preferably used. Alternatively, a hydrochloride, hydrobromide or hydriodide of an organic base such as aniline or pyridine, may be used. In this case the reaction is preferably effected at an elevated temperature.

When $R_3$ in the compounds of formula II is a radical capable of being removed hydrogenolytically, the treatment may be effected with catalytically activated hydrogen. Suitable radicals capable of being removed hydrogenolytically are benzyl, benzyl substituted with suitable substituents, benzhydryl and trityl. The catalytic hydrogenation may be effected in an inert solvent, e.g. ethyl acetate, dioxane, tetrahydrofuran and dimethyl formamide, or in a lower alcohol such as methanol or ethanol. The hydrogenation is preferably effected at a temperature between $0°$ and $100°$ C. The hydrogen pressure may be from 1 to 100 atmospheres. Suitable catalysts are the usual noble metal catalysts, preferably palladium. The noble metal catalysts may, for example, be present as carrier catalysts, e.g. palladium on charcoal.

Process variant b) of the invention may be effected by treating a compound of formula III with an organometallic or organometalloid reducing agent, e.g. diborane, ethoxy-methoxy-sodium-aluminium hydride, sodium-aluminium hydride or lithium-aluminium hydride. There may be present an inert solvent, preferably a cyclic or open chain ether, e.g. tetrahydrofuran, dioxane, diethyl ether, diglyme or dibutyl ether. The reduction is preferably effected at a temperature between about $0°$ and $80°C$. The decomposition of the reaction complex is effected in known manner from the reaction mixture.

The compounds of formula I may be isolated from the reaction mixture and purified in known manner. Free base forms may be converted into acid addition salt forms in conventional manner and vice versa. A suitable acid is hydrobromic acid.

Compounds of formula II, used as starting materials in process variant a) may be obtained by a') selectively reducing the carbonyl groups in a compound of formula VIII,

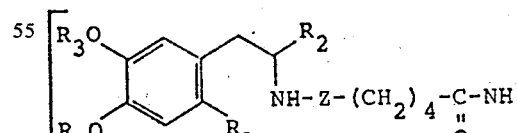
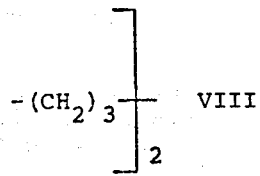

VIII wherein
$R_1$ and $R_2$ are hydrogen or lower alkyl, and $R_3$ is a radical capable of being removed acidolytically or hydrogenolytically, and Z is carbonyl or methylene.

Process variant a') may be effected in conventional manner. A suitable reducing agent is lithium aluminium hydride. A suitable solvent is absolute tetrahydrofuran. The reaction may be effected at from room to reflux temperatures.

Further starting materials may be obtained by:- b') condensing a compound of formula VII,

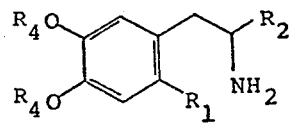   VII wherein $R_1$ and $R_2$ are hydrogen or lower alkyl, and each $R_4$ is hydrogen or the same as $R_3$ defined above, with a compound of formula X,

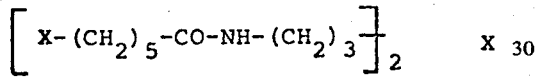   X wherein

X is a group capable of being split off with the hydrogen of amines, to produce a compound of formula III used as starting material in process variant b) or a compound of formula VIII, wherein Z is methylene used as starting material in process variant a') according to the respective defination of $R_4$.

Process variant b') may be effected in conventional manner for such condensation reactions. X is preferably bromine. A lower alkanol such as ethanol is preferably used as solvent. An acid binding agent, e.g. pyridine, is conveniently present. The reaction is conveniently effected at reflux temperatures.

A compound of formula VIII wherein Z is carbonyl may be obtained by condensing a compound of formula VII wherein $R_4$ is $R_3$ as defined above with a compound of formula VI,

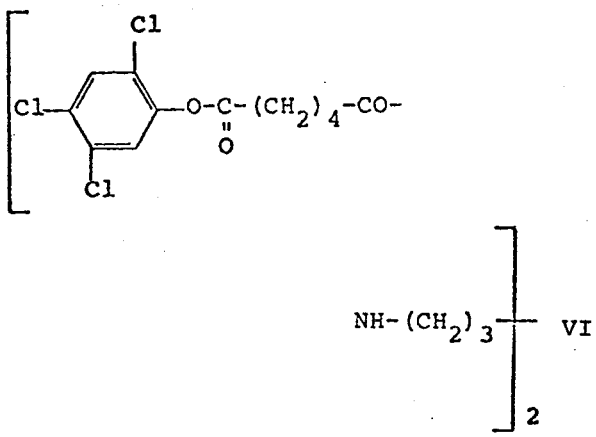   VI obtainable by condensing 2,4,5-trichloro-phenol with a compound of formula V,

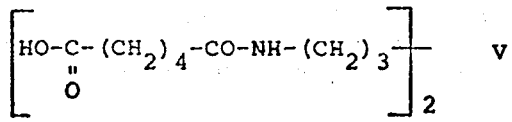   V obtainable by condensing hexamethylene diamine with a compound of formula IV,

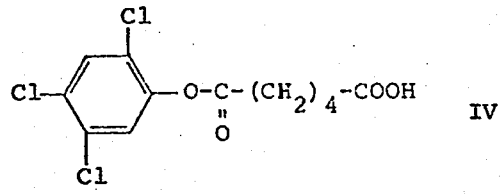   IV

The compounds of formulae V and VI and VIII wherein Z is carbonyl are conveniently not isolated but reacted in situ. The reactions may be carried out in conventional manner.

The compound of formula IV may be prepared by condensing 2,4,5-trichlorophenol with adipic acid, in conventional manner.

The compound of formula X used as starting material in process variant b') may be obtained in conventional manner by condensing hexamethylene diamine with a compound of formula X·[CH$_2$]$_5$·CO·Cl wherein X is as defined above.

Insofar as the production of any of the starting materials is not particularly described these compounds are known, or may be prepared in known manner or may be prepared in analogous manner to processes herein described or to known processes.

In the following non-limitative Examples all temperatures are indicated in degrees Centigrade.

EXAMPLE 1

N,N'-bis-{6-[(3,4-dihydroxyphenyl)ethylamino]-hexyl}hexamethylene diamine 1 g of N,N'-bis-{6-[(3,4-dimethoxyphenyl)-ethylamino]hexyl}hexamethylene diamine is suspended in 50 cc of methylene chloride, and 1.3 cc of boron tribromide in 5 cc of methylene chloride are added dropwise at 0°. Stirring is effected at room temperature for 45 minutes, and the complex is broken down by adding methanol. After evaporating several times with methanol, the residue is treated with isopropanol and ether. The title compound is obtained in the form of the tetrahydrobromide. $C_{34}H_{58}N_4O_4$ + 4 HBr; M.P. 200°.

The N,N'-bis-{6-[(3,4-dimethoxyphenyl)-ethylamino]hexyl}hexamethylene diamine, used as starting material, is obtained as follows:

1. Adipic acid mono-2,4,5-trichlorophenyl ester 59 g of 2,4,5-trichlorophenol, 44 g of adipic acid and 62 g of dicyclohexyl carbodiimide are dissolved in 600 cc of tetrahydrofuran, and the solution is allowed to stand at room temperature for 16 hours. The precipitated urea is filtered off and the tetrahydrofuran is evaporated in a vacuum. The residue is fractionated from ethanol/water, whereby the title compound is obtained. M.P. 80°–82°.

2. $N_2,N'_2$-bis-(3,4-dimethoxyphenylethyl)-$N_1$, $N'_1$-hexamethylene bis-(adipic acid diamide)

325 g of adipic acid mono-2,4,5-trichlorophenyl ester and 58 g of hexamethylene diamine are dissolved in 5 liters of dimethyl formamide. The solution is allowed to stand at room temperature for 16 hours, and 20 g of 2,4,5-trichlorophenol and 206 g of dicyclohexyl carbodiimide are added to the resulting, not isolated adipic acid N,N'-hexamethylene diamide, and the mixture is allowed to stand at room temperature for 16 hours. The resulting suspension containing adipic acid 2,4,5-trichlorophenyl ester N,N'-hexamethylene diamide is heated to 50°, and 181 g of homoveratrylamine are added. A solution is first obtained and then a suspension is soon formed. After allowing to stand for a further 6 hours, the title compound is filtered off with the urea, and the residue is dissolved in methylene chloride/methanol (8:2). Isopropanol is subsequently added and the solution is subsequently concentrated in a vacuum, whereby the title compound is obtained. M.P. 192°–194°.

N,N'-bis-{6-[(3,4-dimethoxyphenyl)ethylamino]-hexyl}-hexamethylene diamine 3.4 g of lithium aluminium hydride are added to 200 cc of absolute tetrahydrofuran. A suspension of 8 g of $N_2,N'_2$-bis-(3,4-dimethoxyphenylethyl)-$N_1,N'_1$-hexamethylene bis-(adipic acid diamide) in 100 cc of tetrahydrofuran is added dropwise while stirring and introducing nitrogen. The resulting solution is boiled at reflux for 3 hours. After cooling to 0° 10 cc of water are added. The resulting mash is filtered over Hyflo and the solution is precipitated with a solution of hydrochloric acid in ether. The crystals are filtered off by suction and recrystallized from isopropanol/methanol. The title compound, having an M.P. of 298°–300° (decomp.), is obtained.

EXAMPLE 2

N,N'-bis-{6-[3,4-dihydroxyphenyl)propyl-2-amino]-1-hexyl}hexamethylene diamine

N,N'-bis-{6-[3,4-dimethoxyphenyl)propyl-2-amino]-1-hexyl}hexamethylene diamine is reacted in accordance with the process described in Example 1 with boron tribromide.

EXAMPLE 3

N,N'-bis-{6-[3-(2-methyl-4,5-dihydroxyphenyl)-ethylamino]-1-hexyl}hexamethylene diamine N,N'-bis-{6-[3-(2-methyl-4,5-dimethoxyphenyl)-ethylamino]-1-hexyl}hexamethylene diamine is reacted in accordance with the process described in Example 1 with boron tribromide.

EXAMPLE 4

N,N'-bis-{6-[3-(2-methyl-4,5-dihydroxyphenyl)-propyl-2-amino]-1-hexyl}hexamethylene 30 g of N,N'-bis-{6-[3-(2-methyl-4,5-dimethoxyphenyl)propyl-2-amino]-1-hexyl}hexamethylene diamine are boiled at reflux for 8 hours in 300 cc of an aqueous 48% hydrogen bromide solution while introducing nitrogen. After evaporating in a vacuum and digesting several times with ethanol and ether, filtration is effected by suction, whereby the title compound is obtained, M.P. 130°, in tetrahydrobromide form.

The N,N'-bis-{6-[3-(2-methyl-4,5-dimethoxyphenyl)propyl-2-amino]-1-hexyl}hexamethylene diamine, used as starting material, is produced as follows:

1. Hexamethylene-N,N'-1-bromocaproic acid diamide 12 g of hexamethylene diamine and 43 g of bromocaproic acid chloride are dissolved at 0° in 400 cc of ethyl acetate, and 200 cc of a 1 N caustic soda solution are added. The mixture is allowed to stand for 12 hours at a pH of 9 to 10 and is then filtered. The organic phase is washed with water, dried over sodium sulphate, filtered off and concentrated by evaporation. After recrystallizing from hot chloroform the title compound is obtained. M.P. 117°.

2. N,N'-bis-{6-[3-(2-methyl-4,5-dimethoxyphenyl)-propyl-2-amino]-1-hexyl}hexamethylene diamine 34 g of 3,4-dimethoxy-6-methyl-α-methylphenyl-ethyl-amine and 19 g of hexamethylene-N,N'-1-bromocaproic acid diamide are added to 500 cc of ethanol, and the mixture is boiled at reflux for 5 hours. The reaction mixture is cooled, washed repeatedly with a dilute caustic soda solution, taken up in ethyl acetate, dried over sodium sulphate and concentrated by evaporation in a vacuum. The residue is treated with ether and subsequently pulverized. 33 g of the amide derivative of the above title compound are obtained and are further reduced immediately. The amide derivative of the above title compound is added to 500 cc of absolute tetrahydrofuran, and 10 g of lithium aluminum hydride in absolute ether are added dropwise. The mixture is boiled at reflux for 16 hours, is cooled, and the excess lithium aluminium hydride is decomposed at 0° by the addition of water. The solvent is removed by distillation in a vacuum and the residue is extracted with ethyl acetate. Ether/4 N hydrochloric acid solution are added to the dried ethyl acetate phase. After filtering by suction and drying, the title compound is obtained as hydrochloride salt. M.P. 208° (decomp.).

EXAMPLE 5

N,N'-bis-{6-[3,4-dihydroxyphenyl)ethylamino]-hexyl}hexamethylene diamine [process b)]

5.5 g of bis-[6-(N-3,4-dihydroxyphenylethyl)-aminocaproic acid]-N,N'-hexamethylene amide are stirred to a suspension in 500 cc of absolute tetrahydrofuran. 120 cc of 1 N diborane in tetrahydrofuran are added dropwise while introducing nitrogen, and boiling is subsequently effected at reflux for 3 hours. The complex is subsequently broken down with a dilute hydrochloric acid solution, and the solution is evaporated in a vacuum. After evaporating several times with methanol, the residue is recrystallized from isopropanol/hydrogen bromide. The title compound, in tetrahydrobromide form, having an M.P. of 200°, is obtained.

The bis-[6-(N-3,4-dihydroxyphenylethyl)-aminocaproic acid]-N,N'-hexamethylene amide, used as starting material, is produced as follows:

30 g of 3,4-dihydroxyphenyl-ethylamine and 47 g of hexamethylene-N,N'-1-bromocaproic acid diamide are boiled at reflux for 8 hours in a mixture of 500 cc of ethanol and 50 cc of pyridine. The residue is digested with isopropanol and ether. Filtering by suction is subsequently effected and the residue is dried.

The compounds of formula I are furthermore useful as anti-hypertensive agents, as indicated by dopamine receptor stimulation indicated in anaesthetized dogs by an increase in mesenteric arterial blood flow on i.v. administration of about 0.01 to about 0.1 mg/kg animal body weight of the compounds.

For this use the dosage will, of course, vary depending on the compound employed, mode of administration and treatment desired. However, in general, satisfactory results are obtained when administered at a daily dosage of from about 0.01 mg to about 3 mg per kg animal body weight, conveniently given in divided doses 2 to 4 times a day or in sustained release form. For the larger mammals, the total daily dosage is in the range from about 1 to 200 mg, and dosage forms suitable for oral administration comprise from about 0.25 mg to about 100 mg of the compounds admixed with a solid or liquid pharmaceutical carrier or diluent.

The compounds of formula I may be administered in pharmaceutically acceptable acid addition salt form. Such acid addition salt forms exhibit the same order of activity as the free base forms and are readily prepared in conventional manner. Representative acid addition salt forms include organic acid salt forms such as the hydrogen maleate, fumarate, tartrate and methane sulphonate and mineral acid salt forms such as the hydrochloride, hydrobromide and sulphate. A pharmaceutical composition may comprise a compound of formula I, in free base form or in pharmaceutically acceptable acid addition salt form, in association with a pharmaceutical carrier or diluent. Such compositions conveniently contain more than 1% by weight of the compound of formula I and may be prepared by conventional techniques to be in conventional forms, for example, capsules, tablets, suppositories, dispersible powders, syrups, elixirs, suspensions or solutions, for enteral or parenteral administration. Suitable pharmaceutical diluents or carriers include, for example, water, alcohols, natural or hardened oils and waxes, calcium and sodium carbonates, calcium phosphate, kaolin, talc and lactose as well as suitable preserving agents, such as ethyl-p-hydroxybenzoate, suspending agents such as methyl cellulose, tragacanth and sodium alginate, wetting agents such as lecithin, polyoxyethylene stearate and polyoxyethylene sorbitan mono-oleate, granulating and disintegrating agents such as starch and alginic acid, binding agents such as starch, gelatin and acacia, and lubricating agents such as magnesium stearate, stearic acid and talc, in order to provide an elegant and palatable pharmaceutical preparation. Compositions in tablet form may be coated by conventional techniques to delay disintegration of the tablet and absorption of the active ingredient in the gastrointestinal tract and thereby provide sustained action over a long period.

The preferred compositions from the standpoint of ease of administration are solid compositions, particularly solid-filled gelatin capsules and tablets.

The Example 1 compound has been found to be especially effective.

What we claim is:

1. A compound of formula I,

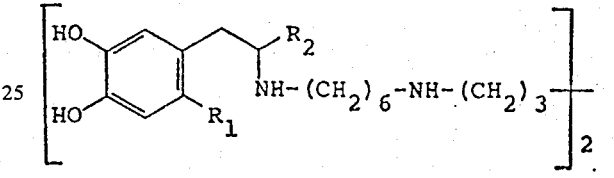

wherein $R_1$ and $R_2$ are hydrogen or lower alkyl, or a pharmaceutically acceptable acid addition salt thereof.

2. The compound of claim 1 which is N,N'-bis{6-[(3,4-dihydroxyphenyl)ethylamino]-hexyl}hexamethylene diamine.

3. The compound of claim 1 which is N,N'-bis-{6-[3,4-dihydroxyphenyl)propyl-2-amino]-1-hexyl}hexamethylene diamine.

4. The compound of claim 1 which is N,N'-{6-[3-(2-methyl-4,5-dihydroxyphenyl)-ethylamino]-1-hexyl} hexamethylene diamine.

5. The compound of claim 1 which is N,N'-bis-{6-[3-(2-methyl-4,5-dihydroxyphenyl)-propyl-2-amino]-1-hexyl}hexamethylene.

* * * * *